United States Patent [19]

Corrente

[11] Patent Number: 4,546,566
[45] Date of Patent: Oct. 15, 1985

[54] WEARABLE FISHING ROD HOLDER

[76] Inventor: Russell J. Corrente, 1110 Cambria St., Portage, Pa. 15946

[21] Appl. No.: 476,260

[22] Filed: Mar. 17, 1983

[51] Int. Cl.⁴ ............................................. A01H 91/10
[52] U.S. Cl. ..................................................... 43/21.2
[58] Field of Search ............... 43/21.2, 54.1; 224/922, 224/200

[56] References Cited

U.S. PATENT DOCUMENTS

| | | |
|---|---|---|
| 1,174,319 | 3/1916 | Hipwood . |
| 1,198,202 | 9/1916 | Drinkard . |
| 1,451,732 | 4/1923 | Hipwood . |
| 2,298,694 | 10/1942 | Haislip ................................... 224/5 |
| 2,537,456 | 1/1951 | Goss ....................................... 224/5 |
| 2,709,544 | 5/1955 | Barringer ............................... 224/5 |
| 2,846,129 | 8/1958 | O'Brien .................................. 224/5 |
| 2,954,909 | 10/1960 | Miller et al. ........................... 224/5 |
| 3,802,652 | 4/1974 | Holton .............................. 43/21.2 X |
| 3,874,573 | 4/1975 | Fruscella et al. ........................ 224/5 |
| 4,081,115 | 3/1978 | White et al. .......................... 43/21.1 |

Primary Examiner—Nicholas P. Godici
Assistant Examiner—M. Jordan
Attorney, Agent, or Firm—Arnold B. Silverman

[57] ABSTRACT

A wearable fishing rod holder has an attachment portion for securing the holder to the user, a base member and a pair of spaced rod receivers. A first rod receiver may have a generally concave, downwardly open configuration and a second rod receiver may have a generally concave upwardly open configuration. The holder is so designed as to permit a fly fishing rod having a reel at or adjacent the butt end of the rod to be secured in the holder by rotational movement and yet be usable with other types of rods.

10 Claims, 7 Drawing Figures

WEARABLE FISHING ROD HOLDER

BACKGROUND OF THE INVENTION

1. Field of the Invention

The present invention relates to a wearable fishing rod holder which is adapted to support a fly fishing rod, as well as other types of rods.

2. Description of the Prior Art

It is frequently necessary or desirable for a fisherman to have a means for supporting the fishing rod in order to free both hands. The fisherman can then use both hands for activities such as baiting a hook, securing or removing artificial lures from the line, attaching hooks to the line, attaching additional leaders or weights to the line, unsnarling knots in the line, removing foreign objects from the hook or for other purposes directly related to the activity also making it desirable to have both hands available.

It has been known to hold a rod between one's arm and body or, when fishing from land or on a boat, to put the rod down Such approaches, while frequently workable, are not ideal in that the rod may move uncontrollably either under the influence of a fish which might be hooked during the period, as a result of rocking of the boat or as a result of the contour of the land on which it was placed. Further, one cannot put the rod down when one is standing in a stream.

Various forms of wearable rod holders designed to be used with casting reels, spinning reels or other reels which are positioned at a substantial distance from the butt end of the rod have been known. These devices have not been adapted for securement of a fly fishing rod which has the reel positioned at or adjacent the butt end of the rod, as these devices have required end-to-end relative sliding insertion of the butt end of the rod into a close ended tubular member. See generally, U.S. Pat. Nos. 1,174,319; 1,198,202; 1,451,732; 2,298,694; 2,954,909 and 3,874,573.

A further problem of the known systems is that they frequently are of rather complex construction and awkward to employ. See, generally, U.S. Pat. Nos. 1,198,202; 2,537,456; 709,544; 2,846,129 and 2,954,909.

There remains, therefore, a significant need for a wearable fishing rod holder which is adapted to be employed with fly fishing rods, as well as other types of fishing rods.

SUMMARY OF THE INVENTION

The above-described need has been met by the wearable fishing rod holder of the present invention. Attachment means are provided for securing the holder to the fisherman. A base member has a pair of spaced rod receivers secured thereto. In a preferred embodiment a first rod receiver will be a generally web-like, concave downwardly open member and a second rod receiver, which will be spaced from the first rod receiver, will be a generally web-like concave upwardly open member. The base member and attachment means may cooperate to define a belt-receiving passageway which facilitates securement of the holder to the user. With this construction, a fly fishing rod may be inserted into the holder by positioning the rod vertically adjacent to the holder and rotating it to a horizontal position wherein lateral portions of the rod are engaged by the rod receivers. The fly fishing reel will then project downwardly from the space between the two rod receivers.

The rod receivers preferably each extend around an arc of about 160 to 270 degrees and are so positioned with respect to the base member to which they are secured, that a rod disposed within the holder will have its longitudinal axis at an angle of about 25 to 60 degrees with respect to a horizontal plane. The holder may advantageously be molded as a unitary article.

It is an object of the present invention to provide a wearable fishing rod holder which will effectively secure a fly fishing rod and reel, as well as other types of rods and reels.

It is a further object of the invention to provide such a rod holder which may readily be secured to the user and may be provided without any moving parts.

It is a further object of the invention to provide such a wearable fishing rod holder which is adapted to receive rods either through rotational movement or longitudinal insertion.

It is a further object of the present invention to provide such a fishing rod holder which is economical to manufacture and will be durable in use.

These and other objects of the invention will be more fully understood from the following description of the invention, on reference to the illustrations appended hereto.

DESCRIPTION OF THE PREFERRED EMBODIMENTS

Figure 1:
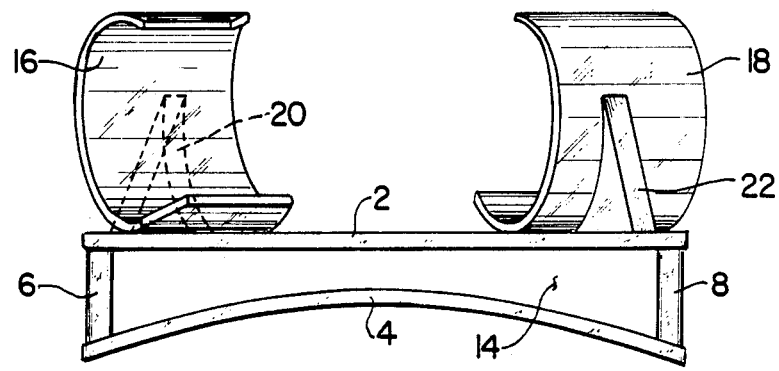
FIG. 1 is a front elevational view of a preferred embodiment of the present invention.
Figure 2:
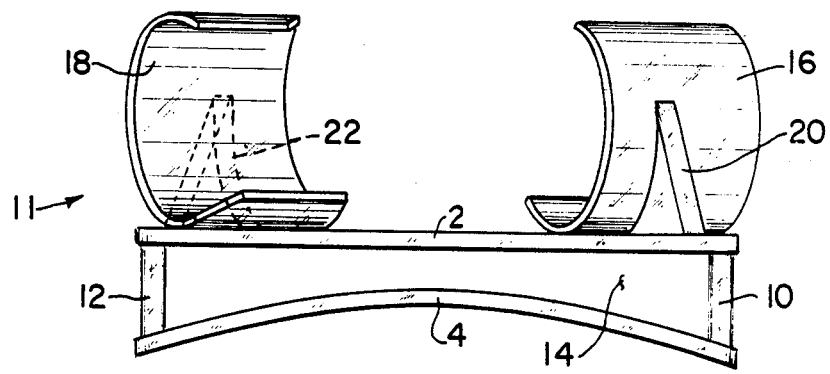
FIG. 2 is a rear elevational view of a preferred embodiment of the present invention.
Figure 3:
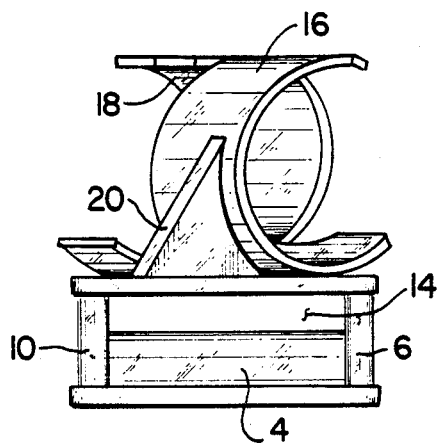
FIG. 3 is a right-hand elevational view of the embodiment shown in FIG. 1.
Figure 4:
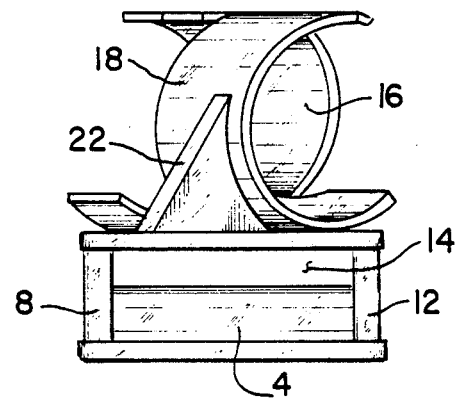
FIG. 4 is a left-hand elevational view of the embodiment shown in FIG. 1.
Figure 5:
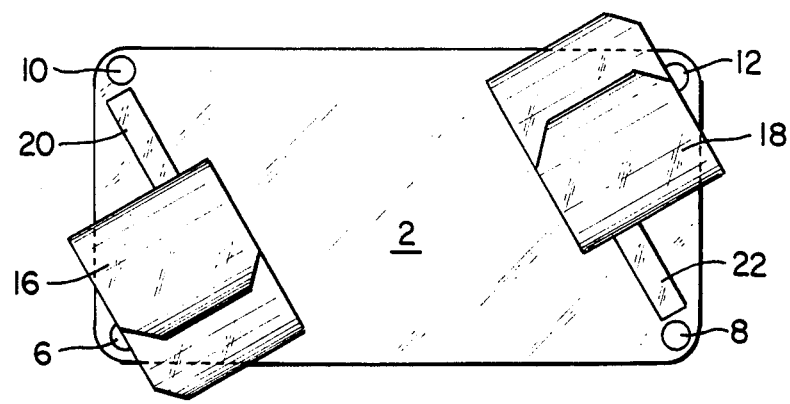
FIG. 5 is a top plan view of the embodiment shown in FIG. 1.
Figure 6:
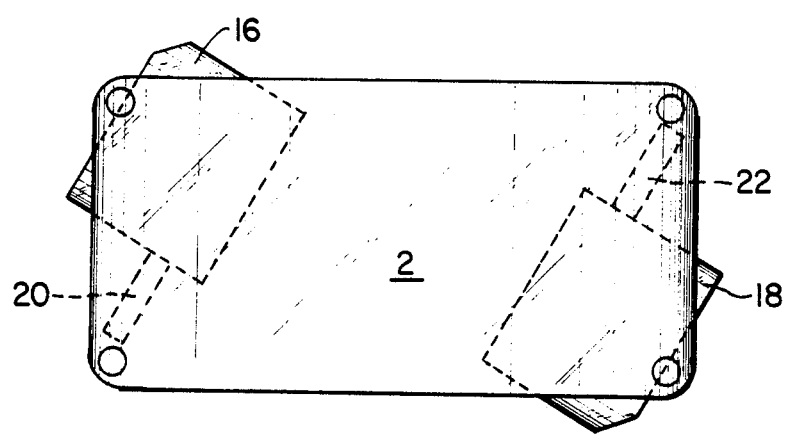
FIG. 6 is a bottom plan view of the embodiment shown in FIG. 1.

Referring more specifically to FIGS. 1 through 6, there is shown the wearable rod holder in a form which is adapted to be placed on a fisherman's belt so as to assume a generally horizontal orientation as is shown in FIG. 5. A base member 2 cooperates with an attachment member 4 which includes a series of connecting posts 6, 8, 10, 12 to define an elongated belt-receiving passageway 14. In securing the holder in the position shown in FIG. 5, the user's belt will be introduced into passageway 14 from either end of the elongated passageway 14 such as is illustrated in FIGS. 3 and 4. The belt will pass completely through the passageway 14. The generally upward bow in the attachment member 4 serves to provide a restriction in the passageway in order to permit more intimate engagement with the belt. It is preferred that the minimum gap in the passageway 14 be such as to provide a certain degree of frictional resistance to the passage of a belt of average thickness therethrough, thereby facilitating mechanical retention and providing resistance to undesired sliding movement once the belt is attached. This is not essential, however, as belt tightening will generally effect adequate securement. If desired, portions of the interior of the passageway-defining faces of base member 2 and attachment member 4 may be provided with a layer of high friction material so as to improve the frictional engagement with the belt.

A pair of rod receivers 16, 18 are secured to the opposite surface of base member 2 from that with which the attachment member 4 cooperates in defining passageway 14. Each rod receiver 16, 18, in the preferred form, is generally web-like and curved with the arc (generated about a central axis running parallel to the longitudinal extent of the rod receiver) preferably being about 160 to 270 degrees. In order to facilitate rotational insertion of the rod, it is necessary that the receivers 16, 18 be an incomplete annulus. It is, however, necessary to have sufficient circumferential extent that the receivers 16, 18 cooperate with each other in providing firm retention of the rod. The combined circumferential arc extent of both receivers 16, 18 is preferably in the range of 340 to 400 degrees. It is noted that in the position in which the rod holder would most likely be used, as is shown in FIG. 5, the first rod receiver 16 is generally concavely downwardly open and the second rod receiver 18 is generally concavely upwardly open. It will be appreciated that a rod positioned vertically between the receivers 16, 18 with the holder in the position shown in FIG. 5 may then be rotated clockwise such that a portion of the rod is recieved within each rod receiver 16, 18.

If desired, for increased retention, frictional insert means may be provided within the concave surfaces of the rod receivers 16, 18 in order to effect improved retention. A resiliently compressible liner, for example, may be provided, if desired.

In the form shown, first rod receiver 16 is provided with bracing member 20 and second rod receiver 18 is provided with bracing member 22.

In the form illustrated, as shown in FIG. 5, the base member 2 is of generally rectangular configuration with curved corners. A central receiver axis running through the two rod receivers 16, 18 will assume a position generally passing through diagonally opposed corners of the rectangular base member 2. It will generally be preferred to have the orientation of the central access of each of the receivers 16, 18 so positioned that a rod received within the same will assume an angle of about 25 to 60 degrees with respect to a horizontal plane.

Figure 7:
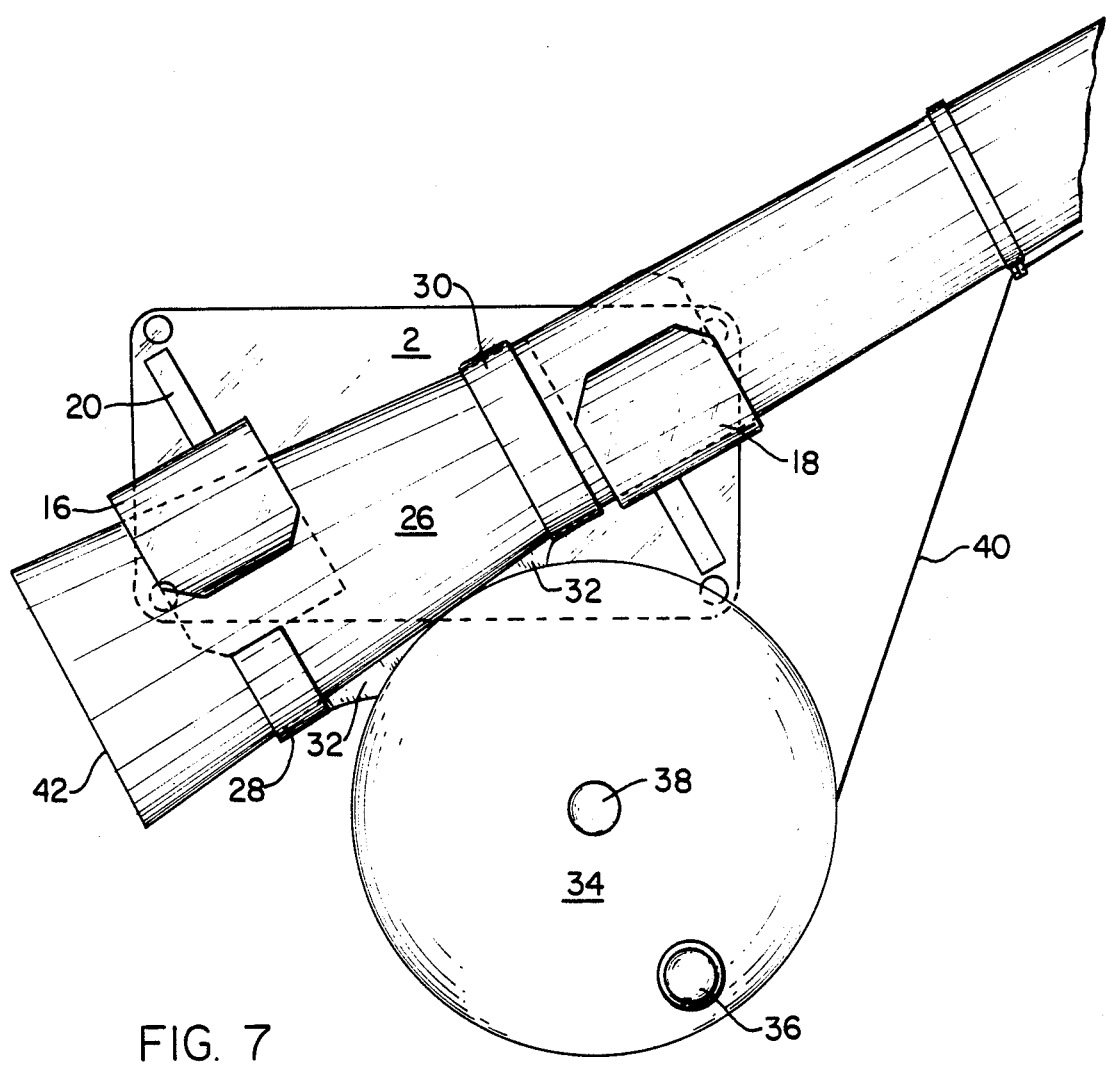
FIG. 7 is an illustration of the wearable rod holder showing schematically a fly fishing rod in position.

FIG. 7 illustrates the fishing rod holder of the other figures with a fly rod in retained position. The rod 26 is intimately engaged peripherally by the rod receiver 16, 18 and annular rod rings 28 (only a portion of this ring has been illustrated for convenience of illustration), 30 are in engagement with the projections 32 of the reel base. The fly reel 34 rotates about shaft 38 and has a handle 36 to secure the same to the rod. Fishing line 40 is stored on the reel 34. By mploying the rotational procedure described above, the rod 26 may have the illustrated butt end 42 firmly secured within the rod holder with the reel 34 which is generally positioned at or closely adjacent the butt end of the rod being disposed primarily in the space underlying the gap between the receivers 16, 18.

The wearable fishing rod holder of the present invention may be made of any suitable materials which possess adequate strength and durability characteristics as well as being economically practical. The assembly may be a unitary assembly composed of multiple parts or may be molded as a unit if desired. One preferred embodiment of the invention involves the use of a unitary molded construction made from a translucent plastic material such as that illustrated. Among suitable materials are polyamide, polycarbonate and acrylic resins. A suitable material is that sold under the trade designation "Cycoloc". Also, metals can be used.

While primary emphasis has been placed upon use of the holder in connection with fly fishing rods, it will be appreciated that the invention is also adapted to be employed to secure other types of fishing rods which may be introduced into the holder either by the above-described rotational method or by relative longitudinal sliding movement. In addition to fly rods and other types of rods, the holder is suitable for use with rods having a "pistol-type" handle. It will be appreciated, that in the preferred embodiment, in order to permit ready rotational movement, the primary if not sole restraint on the rod is circumferential as applied by the rod receivers 16, 18.

If desired, the rod receivers 16, 18 may be made of resilient material which would make the holders more adaptable to the particular rod diameter at the portio0 being restrained.

It will be appreciated, therefore, that the present invention has provided an economical and effective means for fishing rod retention by means of a wearable holder which is adapted to secure fly fishing rods as well as other types. All of this is accomplished in a simple, economical and effective manner.

Whereas particular embodiments of the invention have been described above for purposes of illustration, it will be evident to those skilled in the art that numerous variations of the details may be made without departing from the invention as defined in the appended claims.

I claim:
1. A wearable fishing rod holder comprising:
   attachment means for securing said holder to the user,
   a base member,
   a pair of spaced rod receivers secured to said base member,
   said rod receivers extending around an arc of about 160 to 270 degrees,
   a first said rod receiver having a generally concave downwardly open configuration,
   a second said rod receiver having a generally concave upwardly open configuration, whereby a rod may be supported with an upper rod surface engaged by one said rod receiver and a lower surface being engaged by the other said rod receiver,
   said rod receivers being so spaced and proportioned as to permit a fly rod to be supported in said holder with an associated fly reel depending downwardly therefrom at or adjacent the lower end of said rod,
   said attachment means having a securement member disposed on the opposite side of said base member from said rod receivers,
   said securement member being secured in spaced relationship with respect to said base member to define a belt-receiving passageway therebetween,
   said base member being substantially planar, and
   said securement member being convex toward said base member.
2. The fishing rod holder of claim 1 including
   said rod receivers being spaced from each other sufficiently to permit a rod to be secured to said holder by initial positioning of a rod generally vertically between said rod receivers and rotation of the rod about a generally horizontal axis into supporting position.
3. The fishing rod holder of claim 2 including said rod receivers being so oriented that when said belt-receiving passageway is generally horizontally oriented, said rod will be disposed with its longitudinal axis at an angle of about 25 to 60 degrees with respect to a horizontal plane.

4. The fishing rod holder of claim 3 including
said holder being a unitary article.

5. The fishing rod holder of claim 4 including
said holder being a unitary molded article composed of resinous material.

6. The fishing rod holder of claim 1 including
said second rod receiver being disposed forwardly of said first rod receiver.

7. The fishing rod holder of claim 1 including the sum of the arcs of said first rod receiver and second rod receiver being about 340 to 400 degrees.

8. The fishing rod holder of claim 1 including
said rod receivers being curved web-like members.

9. The fishing rod holder of claim 1 including
each said rod receiver adapted to engage lateral surfaces of said rod, whereby relative rotational and relative longitudinal movement between said rod and said holder is permitted.

10. The fishing rod holder of claim 1 including
said base member being generally rectangular and the central axis about which said rod receivers are developed being oriented generally diagonally with respect to said rectangular base member.

* * * * *

UNITED STATES PATENT AND TRADEMARK OFFICE
CERTIFICATE OF CORRECTION

PATENT NO. : 4,546,566

DATED : Oct. 15, 1985

INVENTOR(S) : Russell J. Corrente

It is certified that error appears in the above-identified patent and that said Letters Patent is hereby corrected as shown below:

Column 1, line 23, a period (.) should be inserted after "down".

Column 1, line 44, "709,544" should be --2,709,544--.

Column 3, line 53, "mploying" should be --employing--.

Column 4, line 19, "portio0" should be --portion--.

Claim 5, line 3, --a-- should be inserted before "resinous".

Signed and Sealed this

Twenty-first Day of January 1986

[SEAL]

Attest:

DONALD J. QUIGG

Attesting Officer

Commissioner of Patents and Trademarks